United States Patent
McAnally et al.

(10) Patent No.: US 7,336,484 B2
(45) Date of Patent: Feb. 26, 2008

(54) COMPUTER SYSTEM CHASSIS INCLUDING A PIVOTABLE CABLE MANAGEMENT BRACKET

(75) Inventors: Andrew L. McAnally, Georgetown, TX (US); Zachary A. Cravens, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/036,464

(22) Filed: Jan. 14, 2005

(65) Prior Publication Data

US 2006/0158842 A1    Jul. 20, 2006

(51) Int. Cl.
*H05K 5/00*    (2006.01)
*H02G 15/08*   (2006.01)
*F16L 3/22*    (2006.01)

(52) U.S. Cl. ............ 361/686; 361/683; 361/725; 361/687; 174/79; 174/99 R; 248/68.1; 248/65

(58) Field of Classification Search ........... 361/679, 361/687–693, 725, 683, 686; 174/79, 99 R; 248/68.1, 65
See application file for complete search history.

(56) References Cited

U.S. PATENT DOCUMENTS

| | | | | |
|---|---|---|---|---|
| 3,905,070 A | * | 9/1975 | Macrae | 403/191 |
| 5,639,049 A | * | 6/1997 | Jennings et al. | 248/74.2 |
| 5,774,330 A | * | 6/1998 | Melton et al. | 361/683 |
| 5,859,767 A | * | 1/1999 | Fontana | 361/818 |
| 5,875,521 A | * | 3/1999 | Woo | 16/280 |
| 6,076,142 A | * | 6/2000 | Corrington et al. | 711/114 |
| 6,462,947 B1 | * | 10/2002 | Huang | 361/695 |
| 6,747,210 B2 | * | 6/2004 | Chen | 174/74 R |
| 6,967,832 B2 | * | 11/2005 | Mariano | 361/683 |
| 2004/0004785 A1 | * | 1/2004 | Seo | 360/97.01 |
| 2004/0004812 A1 | | 1/2004 | Curlee et al. | 361/687 |
| 2005/0067358 A1 | | 3/2005 | Lee et al. | 211/26 |

* cited by examiner

*Primary Examiner*—Jayprakash Gandhi
*Assistant Examiner*—Zachary M Pape
(74) *Attorney, Agent, or Firm*—Baker Botts L.L.P.

(57) ABSTRACT

A chassis having a pivotable bracket is disclosed. The bracket pivots between an up position to permit an internal cable to be coupled to the bracket and pivots to a down position to form a hood for the passage of heated air into the interior of the computer system. When a component is inserted in the computer system, the component contacts the bracket and forces the bracket to move from the up position to the down position.

19 Claims, 4 Drawing Sheets

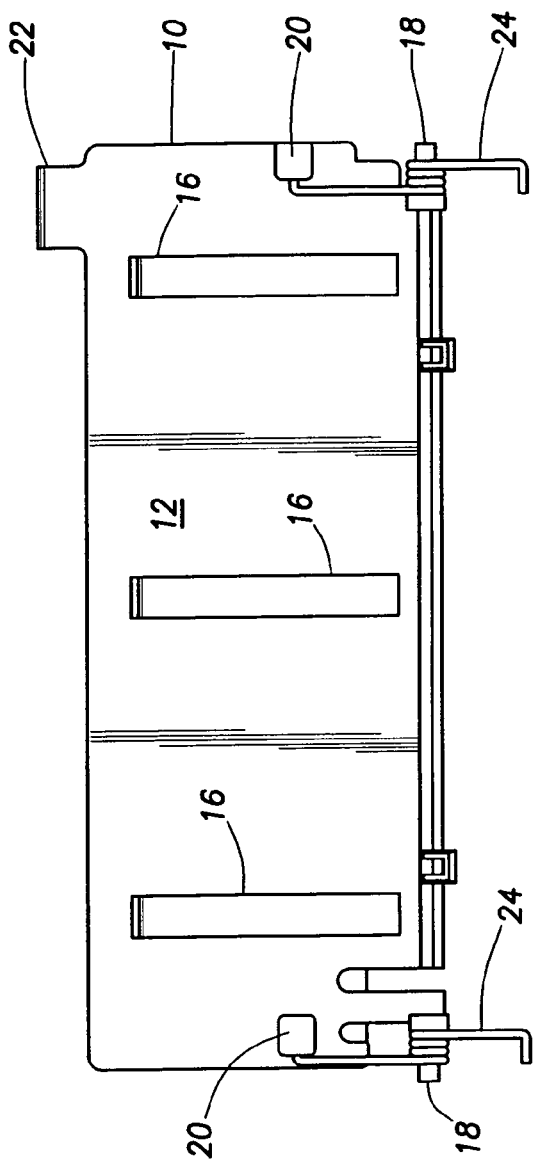
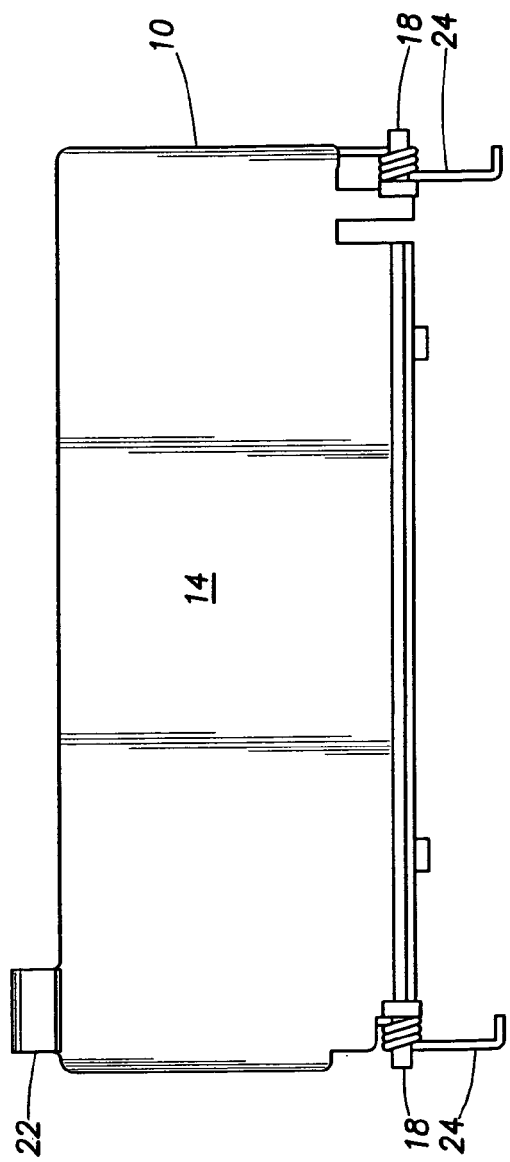
FIG. 1A
FIG. 1B

COMPUTER SYSTEM CHASSIS INCLUDING A PIVOTABLE CABLE MANAGEMENT BRACKET

TECHNICAL FIELD

The present disclosure relates generally to computer systems, and, more particularly, to a computer system chassis that includes a pivotable cable management bracket.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system or computer system will typically include a chassis, the purpose of which is to provide a physical framework to contain and support the various components of the computer system. As the physical size of computer systems grow smaller, the chassis of these computer systems must be proportionately smaller, while accommodating the dense assembly of component parts within the chassis. A difficulty of a dense chassis assembly is dissipating heat generated by the component in the interior of the chassis. Heat generated by these components is often dissipated through the use of heat sinks and fans. The fans create an airflow pathway that draws cooler air into the interior of the chassis and forces heated air out of an exit point in the chassis. If the airflow path is impeded, cool air may not be able to enter the chassis and heated air may not be able to exit the chassis, thereby preventing the chassis from being cooled effectively. One component of the computer system that may block the flow of air through the chassis are internal cables, including wide data or power cables. If the location of the chassis's internal cables are not effectively managed, the internal cables may block airflow pathways in the chassis.

SUMMARY

In accordance with the present disclosure, a pivotable bracket, chassis, and method for manufacture of a chassis are disclosed. The chassis includes a pivotable bracket that pivots to an up position to permit an internal cable to be coupled to the bracket and pivots to a down position to form a hood or duct for the direction of air into the interior of the computer system. When a component, such as a removable hard drive, is inserted in the computer system, the component contacts the bracket and forces the bracket to move from the up position to the down position. The bracket includes a plurality of clips for coupling the cable to the bracket.

The bracket and chassis disclosed herein is advantageous because the bracket and chassis provide a technique for securing one or more internal cables of the computer system during the assembly or servicing of the computer system. An internal cable may impede the assembly of the computer system, and the fixation of the internal cable to the bracket prevents the cable from interfering with the assembly. Moreover, when the computer system needs to be serviced, the internal cable is likewise secured and prevented from interfering with the servicing of the computer system. As an example, the fixation of cable to the bracket allows the motherboard of the computer system to be removed without interference from the internal cable.

Another technical advantage of the internal cable and chassis disclosed herein is that the bracket can pivot from an up position, which is characterized by the coupling of the internal cable to the bracket, to a down position in which the bracket serves as a hood for the ducting of air within the interior of the computer system. The placement of a component, such as a removable hard drive, into the computer system causes the bracket to pivot to the down position, creating an extended horizontal surface adjacent to one or more heat sinks of the computer system. The placement of the horizontal bracket adjacent the heat sink aids in the direction of heated air from the exterior of the chassis through an air inlet enclosure that is proximate the bracket. The placement of the bracket in the down position improves the airflow characteristics of the interior of the chassis. Air that enters the interior of the computer chassis is directed or ducted to the heat sink or heat sinks in the interior of the computer system. The passage of the air through the heat sinks aids the thermal and operational performance of the computer system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1A is a top view of the front face of a cable management bracket;

FIG. 1B is a top view of the rear face of a cable management bracket;

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
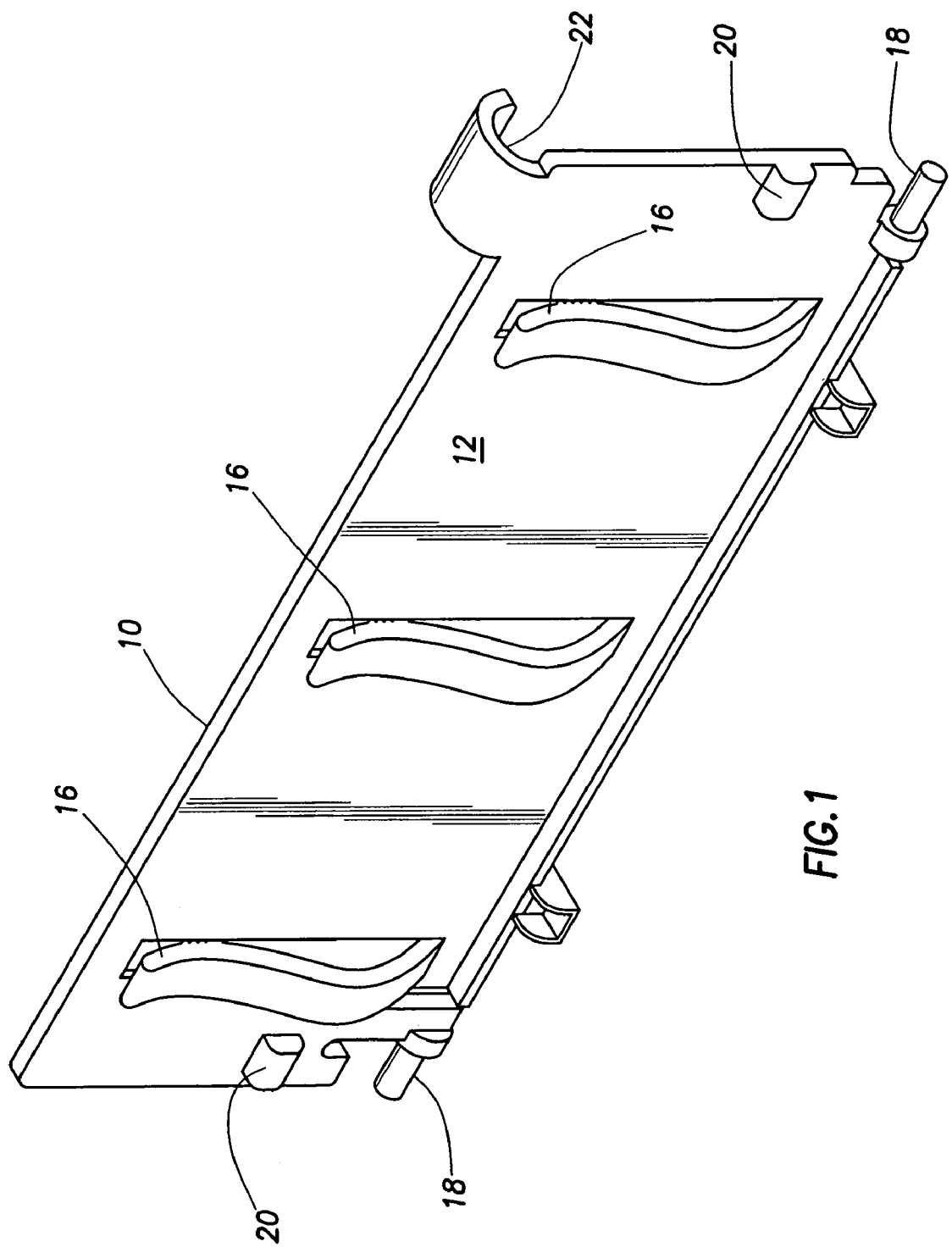
FIG. 1 is a pictorial view of a cable management bracket.

Shown in FIG. 1 is a pictorial view of a cable management bracket 10. Cable management bracket 10 includes a front face 12 and a rear face 14. Rear face 14 is not visible in FIG. 1. Front face 12 includes three cable clips 16. One or more internal cables may be held in place between cable clips 16 and front face 12. Clips 16 are sized to hold wide power or data cables, including ribbon cables. The front face 12 of bracket 10 also includes a pair of sockets 20, and the bottom of bracket 10 includes a pair of posts 18. Bracket 10 is coupled to the. Each one of the pair of springs is wound around one of the posts 18, and the end of each of the springs terminates in socket 20. The top of bracket 10 includes a curved retaining hook 22. of the rear face 14 and is sized to receive and retain a round cable. The front face 12 and the rear face 14 are denominated as the front and rear face with respect to a point of perspective of the chassis. Any other naming convention could be used to distinguish between the two faces of the cable management bracket.

Shown in FIG. 1A is a top view of the front face 12 of the cable management bracket 10. Shown in FIG. 1A are the three cable clips 16 and the pair of sockets 20. As shown in FIG. 1A, a spring 24 is wound around each post 18 of bracket 10. One end of each spring terminates in socket 20.

Unlike front face 12, rear face 14 does not include any clips 16 and is planar, with with the exception of the curved retaining hook 22 and the top of the bracket.

Figure 2:
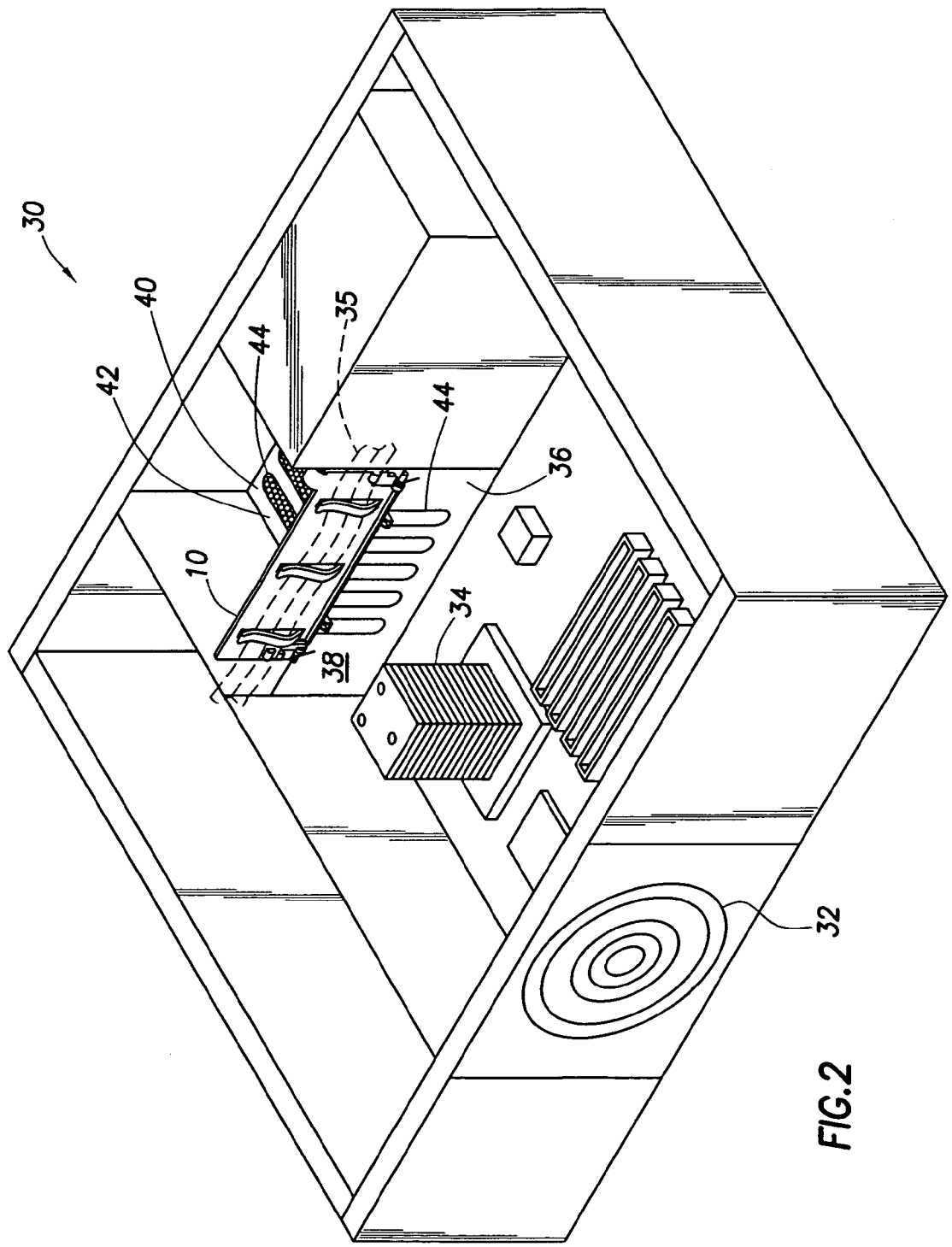
FIG. 2 is a pictorial view of the interior of a chassis of a computer system.

Shown in FIG. 2 is a perspective view of the interior of chassis 30 of a computer system. In the example of FIG. 2, chassis 30 includes an air outlet 32 and a heat sink 34. An air inlet enclosure 42 is formed by a side surface 38 and a top surface 40. Side surface 38 includes a number of openings 44, which allow air to pass into the air inlet enclosure 42. included in chassis 30 is cable management bracket 10. Bracket 10 is coupled to the chassis at a point proximate the corner that is formed by the intersection of the side surface 38 and top surface 40. In the example of FIG. 2, bracket 10 is in the up position, which is characterized as a position in which front face of the bracket is visible and the clips on the front face are exposed and readily accessible. In the up position, an internal cable 35 can be secured in place by threading the cable through each of the clips of the bracket. When the bracket is in the up position, the internal cable can be easily fixed to the bracket, as the clips are easily accessible. The internal cable 35 of FIG. 2 is shown in dashed lines. The placement of one or more internal cables in the clips assists in the manufacture of the computer system. Because the internal cable is held in place in a location that is away from the center of the chassis of the computer system, components can be installed in the chassis of the computer system without having to account for the location of the internal cable. In addition, the fixation of the internal cable in the up position also assists in the servicing of the computer system. As an example, with the internal cable fixed in the up position, the motherboard can be removed from the computer system without having to account for the location of the internal cable.

Figure 3:
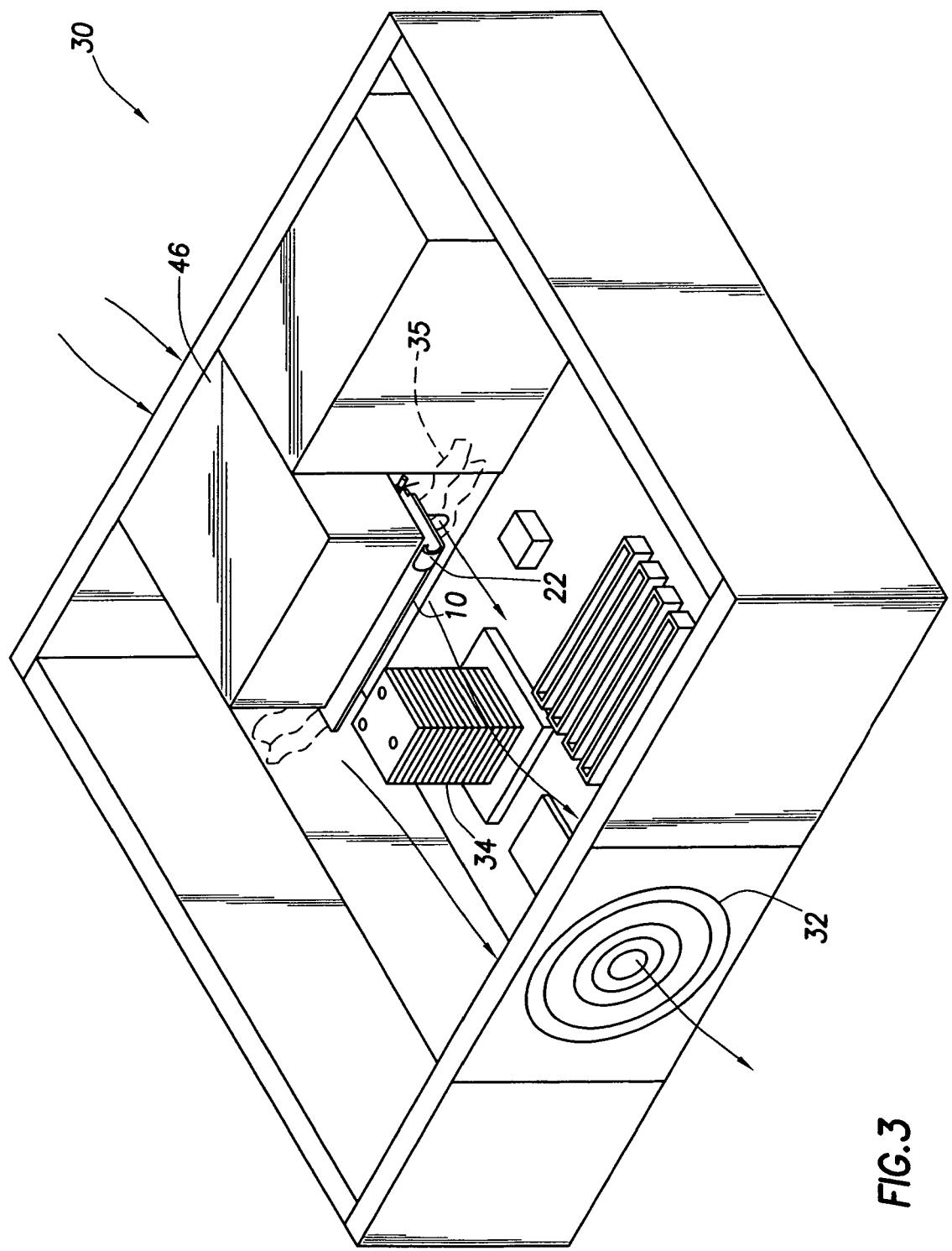
FIG. 3 is a pictorial view of the interior of a chassis of a computer system following the insertion of a removable hard drive bay.

In FIG. 3, a removable hard drive bay 46 has been inserted into the chassis. Removable hard drive bay 46 is slid into place in the chassis in the space that is located immediately above the air inlet enclosure. When removable hard drive bay 46 is slid into place in chassis 30, removable hard drive bay 46 contacts bracket 10, causing bracket 10 to pivot to a down position in which the faces of the bracket are parallel with the base or motherboard of the chassis. In the down position, the clips of bracket 10 are not easily accessible, as these clips are located on the underneath side of bracket 10. After the contact between hard drive bay 46 and bracket 10 places the bracket in the down position, hard drive bay 46 can travel over the flat rear face of bracket 10.

As can be seen from FIG. 3, the placement of bracket 10 in the down position does not impede the flow of air out of the chassis of the computer system, but instead serves as an additional duct for the passage of air through the interior of the computer system. Cooler air is drawn into the chassis by a fan that is placed in the interior of the chassis adjacent to air outlet opening 32. The movement of the fan draws air through the openings 44 in air inlet enclosure 42 and in the direction of heat sink 34. Heat sink 34 is placed on top of or adjacent to a heat-producing component of the computer system. A heat-producing component of the computer system may include, for example, a processor or a voltage regulator of the computer system. After the air passes through heat sink 34, the air is directed out of the chassis through air outlet 32. Air flows through the chassis of the computer system in the direction of the arrows shown in FIG. 3.

The placement of hard drive bay 46 on top surface 40 prevents heated air from escaping from the air inlet enclosure 42 through the openings in top surface 40. Instead, the movement of air by the fan of the computer system and the absence of alternate exit paths in the air inlet enclosure forces the heated air to travel in the direction of the heat sink. The placement of the bracket in the down position also serves to prevent the cooler air from escaping into other regions of the chassis, thereby forcing the cooler air to travel through or in the vicinity of the heat sink. When the bracket is in the down position, the top of the bracket, which is the edge of the bracket that includes the retaining hook, is physically proximate the heat sink. Thus, once cooler air leaves the air inlet enclosure, the placement of the bracket proximate the heat sink prevents the cooler air from rising into the interior of the chassis. Instead, the bracket acts as a duct to force the cooler air into the desired location in the interior of the chassis. The placement of the internal cable in the clips of the bracket prevents the internal cable from blocking the openings in the side surface of the air inlet enclosure. If the internal cable was not secured by the clips of the bracket, the internal cable could float into a position in which it blocked the openings of the air inlet enclosure, preventing cooler air from reaching the thermal components of the computer system.

The pivotable bracket disclosed herein serves as both an aid in the manufacturing process and a hood for the direction of air into the interior of the computer system. The present invention has been described with reference to a removable hard drive bay. It should be recognized, however, that the bracket of the present invention may be employed with any other removable component of the computer system. It should be recognized that the bracket disclosed herein may be used in conjunction with any component of the computer system that allows the bracket to be placed in an up position when the component is removed and places the bracket in a down position when the component is installed in the computer system. The bracket disclosed herein is both an aid in the manufacturing process and a feature of an effective airflow path in the interior of the computer system. Although the present disclosure has been described in detail, it should be understood that various changes, substitutions, and alterations can be made hereto without departing from the spirit and the scope of the invention as defined by the appended claims.

What is claimed is:

1. A cable management bracket for an information handling system, comprising:
    a first surface, wherein the first surface includes a clip operable to retain a cable;
    a second surface, wherein the second surface is substantially planar;
    a curved hook protruding from one edge of the bracket;
    a first slot and a second slot formed in the first surface;
    a post element formed proximate a second edge of the bracket, wherein the post element, the first slot, and the second slot are sized such that a first spring is operable to be coupled between the post and the first slot and a second spring is operable to be coupled between the post and the second slot.

2. The cable management bracket of claim 1, wherein the cable management bracket is formed of a plastic.

3. The cable management bracket of claim 1, wherein the clip is sized to receive a cable.

4. The cable management bracket of claim 1, wherein the first surface includes a plurality of clips, each of which is sized to receive a cable.

5. The cable management bracket of claim 1, wherein the hook is curved in the direction of the second surface.

6. The cable management bracket of claim 1,
    wherein the first surface includes a plurality of clips, each of which is sized to receive a cable;
    wherein the hook is curved in the direction of the second surface; and
    wherein the cable management bracket is formed of a plastic.

7. A chassis for an information handling system, comprising:
    an enclosure having a top surface and a side surface with a plurality of air openings formed therein for the passage of air from the interior of the chassis to the exterior of the chassis; and
    a pivotable bracket coupled to the interior of the chassis and proximate the enclosure, wherein the bracket is pivotable between an up position in which a cable is operable to be secured to the bracket and a down position in which the bracket is substantially parallel to the top surface of the enclosure and serves as a hood for the direction of air into the interior of the enclosure, wherein the insertion of a component into the chassis causes the component to contact the pivotavble bracket and force the pivotable bracket to pivot to the down position.

8. The chassis of claim 7, wherein the pivotable bracket is operable to pivot as a result of the insertion of a removable hard drive bay into the chassis.

9. The chassis of claim 7,
    wherein the pivotable bracket includes a curved hook that is sized to receive a round cable.

10. The chassis of claim 7, wherein the pivotable bracket includes a clip for securing the cable to the bracket.

11. The chassis of claim 7, further comprising a spring coupled between the pivotable bracket and the interior of the chassis.

12. The chassis of claim 7,
    further comprising a spring coupled between the pivotable bracket and the interior of the chassis;
    wherein the spring biases the pivotable bracket in the up position; and
    wherein the insertion of a component in the interior of the chassis causes the pivotable bracket to pivot to the down position.

13. The chassis of claim 7,
    further comprising a spring coupled between the pivotable bracket and the interior of the chassis;
    wherein the spring biases the pivotable bracket in the up position; and
    wherein the insertion of a removable hard drive bay in the interior of the chassis causes the pivotable bracket to pivot to the down position.

14. The chassis of claim 7,
    further comprising a spring coupled between the pivotable bracket and the interior of the chassis;
    wherein the spring biases the pivotable bracket in the up position;
    wherein the insertion of a removable hard drive bay in the interior of the chassis causes the pivotable bracket to pivot to the down position; and
    wherein the pivotable bracket includes a curved hook that is sized to receive a round cable.

15. A method for manufacturing an information handling system, comprising the steps of:
    providing a chassis of a computer system, wherein the chassis of the computer system includes an enclosure having a top surface and a side surface with a plurality of air openings formed therein for the passage of air from the interior of the chassis to the exterior of the chassis;
    coupling a pivotable bracket to the chassis at a location proximate the intersection of the top surface and the side surface of the enclosure, wherein the insertion of a component into the chassis causes the pivotable bracket to pivot;
    coupling a cable to the bracket; and
    inserting a component in the chassis, wherein the component is inserted in the chassis at a location above the top surface of the enclosure and wherein the insertion of the component causes the bracket to pivot to a position in which the plane of the bracket is substantially parallel to the plane of the top surface of the enclosure.

16. The method for manufacturing an information handling system of claim 15, wherein the bracket includes a curved hook that is sized to receive a round cable.

17. The method for manufacturing an information handling system of claim 15, wherein the insertion of the component in the chassis causes the bracket to pivot to a position in which the bracket forms a duct to direct blown air to a desired location in the interior of the chassis.

18. The method for manufacturing an information handling system of claim 15,
   wherein the bracket is coupled to the chassis by a spring; and
   wherein the bracket is biased by the spring into an up position in which the plane of the bracket is substantially perpendicular to the top surface of the enclosure.

19. The method for manufacturing an information handling system of claim 15, wherein the cable is coupled to the bracket by threading the cable through a clip formed in the bracket.

* * * * *